US009668300B2

(12) United States Patent
Anderson et al.

(10) Patent No.: US 9,668,300 B2
(45) Date of Patent: May 30, 2017

(54) FILTERING APPARATUS AND METHOD FOR MULTIBAND RADIO

(71) Applicant: MOTOROLA SOLUTIONS, INC, Schaumburg, IL (US)

(72) Inventors: Henry W. Anderson, Palatine, IL (US); Timothy S. Mosher, Harvard, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 84 days.

(21) Appl. No.: 14/839,189

(22) Filed: Aug. 28, 2015

(65) Prior Publication Data

US 2017/0064773 A1 Mar. 2, 2017

(51) Int. Cl.
*H04W 36/00* (2009.01)
*H04W 88/06* (2009.01)
*H04L 5/14* (2006.01)
*H04B 1/525* (2015.01)

(52) U.S. Cl.
CPC ............ *H04W 88/06* (2013.01); *H04B 1/525* (2013.01); *H04L 5/14* (2013.01)

(58) Field of Classification Search
None
See application file for complete search history.

(56) References Cited

U.S. PATENT DOCUMENTS 9,066,363 B2 6/2015 Anderson et al.
9,480,031 B2 * 10/2016 Kazmi ................. H04W 28/18
2004/0208137 A1 * 10/2004 Martinez ................. G01S 19/35
  370/282
2012/0236738 A1 * 9/2012 Laurila ................ H04B 7/0825
  370/252
2012/0327821 A1 * 12/2012 Lin ..................... H04W 72/048
  370/280
2013/0272436 A1 10/2013 Makhlouf et al.
2014/0055210 A1 2/2014 Black et al.
2015/0003302 A1 * 1/2015 Ekpenyong ........... H04W 72/14
  370/280
2016/0057051 A1 * 2/2016 McAndrew ........... H04L 45/245
  370/392
2016/0352369 A1 * 12/2016 Smith ................... H04L 5/0012

OTHER PUBLICATIONS

The International Search Report and The Written Opinion, corresponding Patent Application No. PCT/US2016/048625, filed Aug. 25, 2016, all pages.

* cited by examiner

*Primary Examiner* — Brandon Renner
(74) *Attorney, Agent, or Firm* — Barbara R. Doutre

(57) ABSTRACT

A portable radio provides operation in LTE and LMR radio bands. Improved filtering in the LTE receive path is provided through the use of a linear duplexer and a SAW filter. The SAW filter is implemented as a duplexer with one port terminated to provide a filter for the LTE RX path. The linear duplexer and SAW filter provide filtering for an LMR TX signal and an LTE TX signal which are simultaneously present at an LTE antenna of the radio. The linearity of the linear duplexer which reduces LTE TX and LMR TX signal levels combined with the selectivity of the SAW filter prevents intercept intermodulation in the LTE RX path.

17 Claims, 4 Drawing Sheets

FILTERING APPARATUS AND METHOD FOR MULTIBAND RADIO

FIELD OF THE DISCLOSURE

The present disclosure relates generally to portable radios and more particularly to portable radios providing multiband operation and the prevention of spurious emissions during multiband operation.

BACKGROUND

The desire for portable multiband radio operation has grown significantly over recent years. The ability to communicate over different frequency bands, using different protocols and operating modes allows a wider variety of options for users. For example the ability to transmit, receive and process voice, data, and video using one device as opposed to carrying several different devices is highly advantageous in the public safety arena. Public safety personnel often work in environments where access to a variety of communication mediums is highly relevant such as law enforcement, fire departments, and search and rescue.

Two types of radio operation that are deemed desirable to have available in one overall system for public safety applications are: Long-Term Evolution (LTE) operation for high speed, full-duplex data and Land Mobile Radio (LMR) operation for half-duplex voice operation.

LTE full-duplex operation which facilitates high-speed data communications takes place in 3GPP standardized bands. LTE band 13 uplink frequencies cover 777-787 MHz and downlink frequencies cover 746-756 MHz. LTE band 14 uplink frequencies cover 788-798 MHz and downlink frequencies cover 758-768 MHz. LTE band 14 has been designated for public safety operations in the US.

LMR radio operates as a half-duplex, voice radio in UHF frequency bands. For public safety narrowband applications the UHF frequency bands of operation have been designated 799 to 805 and 805 to 817 megahertz (MHz)/769 to 775 and 851 to 862 MHz—also referred to as the 700/800 MHz band. Thus, the spectral allocations of the LTE band and the LMR public safety narrowband are close.

From an implementation standpoint, in order for a portable radio to include both LTE and LMR transceivers in the same handheld unit, both transceivers may be physically close to one another. The spectrum allocations of the LTE band being spectrally near the LMR narrowband voice band and the physical proximity LTE transceiver and LMR transceiver within the handheld unit can cause problems when certain transmit and receive conditions are all active simultaneously—which is feasible in multiband radios.

Some energy from an LMR transmit signal may combine with energy from an LTE transmit signal after the LTE antenna, while the LTE receiver is active thereby creating spurious emissions. For example, B14 receive problems can occur when the LMR TX is above 808 MHz. In particular, intermodulation (IM) spurs are prone to being created in the LTE receive path causing desense in this path.

Accordingly, it would be desirable to have a means of negating such spurious emissions in a portable multiband radio. In particular, the ability to eliminate spurs in an active LTE receive path during the presence of simultaneous transmit LTE and transmit LMR transmissions is highly desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
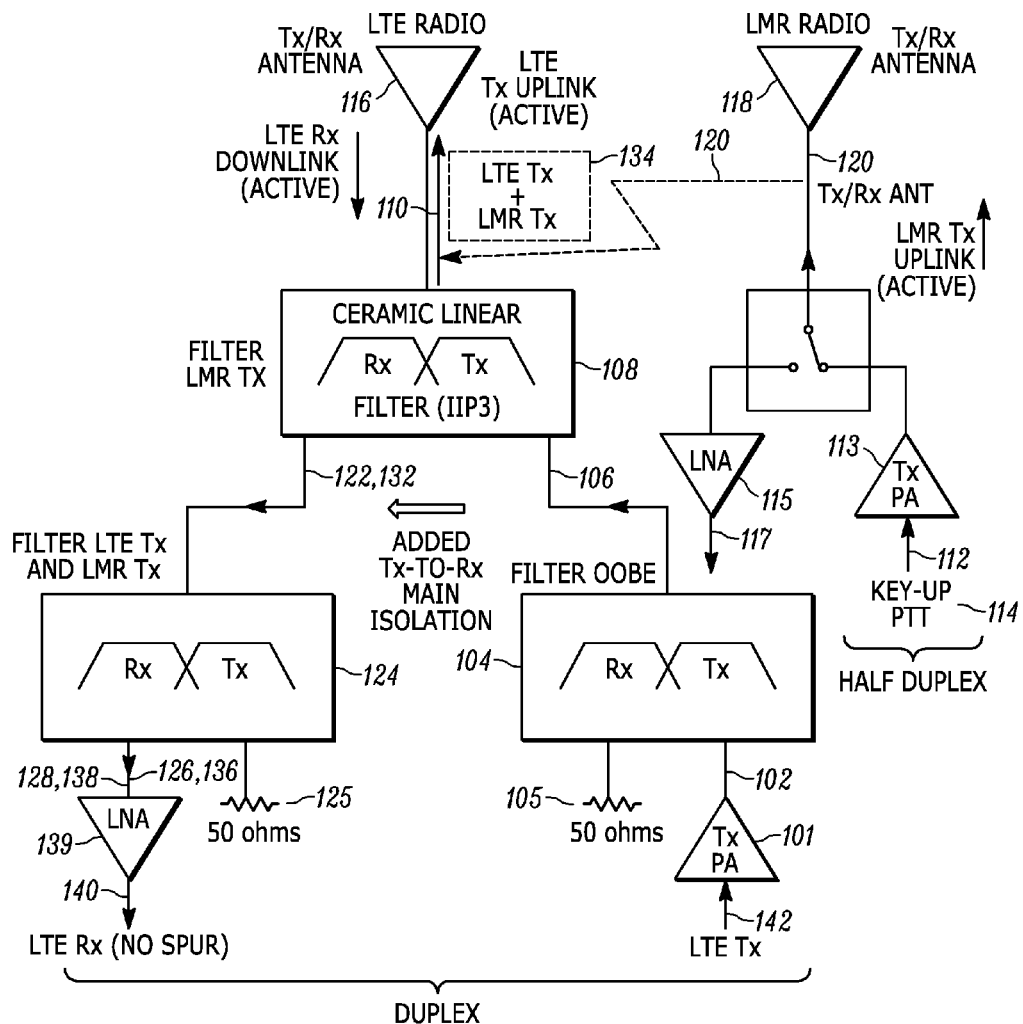
FIG. 1 is a circuit diagram of a filtering system for a portable radio in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a multiband radio providing both long term evolution (LTE) and land mobile radio (LMR) radio operation. In accordance with some embodiments, the portable radio provides a means for eliminating spurs in the LTE receive path during simultaneous transmit LTE and transmit LMR transmissions during an active LTE receive downlink. The elimination of spurious emissions in the receive path is achieved via the use of a highly linear duplexer coupled to a surface acoustic wave (SAW) filter coupled between the LTE antenna and the receiver low noise amplifier (LNA). RF component linearity, as well known by practitioners, is typically defined in terms of intercept point (third order intercept point (IP3) for instance). More RF linear parts have higher intercept points. The linearity of the linear duplexer and selectivity of the SAW filter reduces LTE transmit and LMR transmit signal levels so as to not generate spurious emissions in the LTE receiver path.

FIG. 1 is a circuit diagram of a portion of a portable radio 100 in accordance with some embodiments. Portable radio 100 comprises an LTE transceiver coupled to an LTE antenna 116 for operation in a full duplex mode and an LMR transceiver coupled to an LMR antenna 118 for operation in a half-duplex mode. The LTE transceiver operates using an LTE receive (RX) path 140 and an LTE transmit (TX) path 142 for operation in full duplex mode. The LMR transceiver operates using an LMR transmit (TX) path 112 and an LMR receive (RX) path 117 for operation in the half-duplex mode. In some embodiments of operation, portable radio 100 may have more than one transceiver operational at one time, while an LTE receiver is actively receiving.

The LTE transceiver comprises, in the LTE TX path 142, a power amplifier 102, a SAW filter 104 (a TX SAW filter), a linear filter 108, and the LTE antenna 116. In the LTE RX path 140, the LTE antenna 116 couples to the linear filter 108, which couples into another SAW filter 124 (a RX SAW filter) which is coupled to a low noise amplifier (LNA) 139. The LMR transceiver comprises, in the LMR TX path 112, a push-to-talk (PTT) controls key-up 114 of a transmit power amplifier 113 which is switchably coupled to the LMR antenna 118. In the LMR RX path 117, the LMR antenna 118 is switchably coupled to an LMR RX LNA 115. Other radio components for radio operation, such as a controller, memory, power, audio, to name a few, are not shown or described but are understood to be known in the art of radio technology.

For the purposes of this application SAW filter 124 will be referred to as the first SAW filter or receive (RX) SAW filter, and SAW filter 104 will be referred to as the second SAW filter or transmit (TX) SAW filter. In accordance with some embodiments, the first SAW filter 124 is implemented as a duplexer with one port terminated 125 for providing a filter for the LTE RX path 140 of the portable radio, and the second SAW filter 104 is implemented as a duplexer with one port terminated 105 for providing a filter in the LTE TX transmit path 142 of the portable radio.

Further in accordance with some embodiments, the linear duplexer 108 and the first SAW filter 124 filter an LMR TX signal and an LTE TX signal which are simultaneously present 134 at the LTE antenna 116 combine to eliminate intermodulation spurs before they are generated in an active LTE RX path 140. In accordance with some embodiments, LTE TX signal 110 and LMR TX signal 120 are filtered at linear duplexer 108 which produces filtered signals 122, 132 which are then further filtered at SAW filter 124 which generates signals 126,136 which effectively have no spurious emissions to feed into the LTE receive path.

In accordance with some embodiments, the linear duplexer reduces the LTE TX and LMR TX signal levels enough that the following SAW filter does not create intermodulation spurs. The linear duplexer must be linear enough to not create intermodulation spurs itself.

In accordance with the various embodiments, the LMR TX signal 120 and LTE TX signal 110 are filtered through the linear duplexer 108 and the SAW filter 124, wherein the SAW filter being implemented as a duplexer with one port terminated 125, the combined filtering inhibits the generation of intermodulation spurs in the LTE RX signal.

The linear duplexer 108 may comprise a ceramic linear duplexer or other linear duplexer having predetermined transmit-to receive isolation and predetermined blocker attenuation that ensures reduction of the LMR TX signal level and LTE signal level to levels that prevent the SAW filter 124 from generating IM3 spurs above the RX noise floor. For example, a ceramic linear duplexer that lowers levels of the LMR TX signal level and the LTE TX signal level to levels which are sufficient to prevent an interfering spurious signal from being created by RF nonlinearities of the SAW filter preventing spurious emissions at the SAW filter output in the LTE RX path.

In accordance with the various embodiments, there has been provided a RX SAW filter and TX SAW filter augmented with a highly linear duplexer with low TX-to-RX isolation and moderate blocker attenuation. In accordance with the various embodiments, the highly linear duplexer reduces the TX signal and the blocker attenuation sufficiently at the receiver such that the SAW filters do not produce IM3 spurious above the receiver noise floor. The highly linear duplexer is also selected or designed so as not to produce IM3 spurious itself. Ceramic duplexers are an excellent option as they have inherently high linearity.

A SAW duplexer can be used as the RX and TX filters following the augmented duplexer. For example, if 45 dB of desense results in the standard SAW duplexer configuration then the augmented duplexer could satisfy predetermined parameters of for example, Ablocker+2 ITX−RX≥45 dB. One approach, for example, is Ablocker=ITX−RX=15 dB.

The augmented duplexer could also have predetermined parameters of say, an IIP3≥IIP3SAW+45/2 dB or 22.5 dB higher than the SAW filters.

Figure 2:
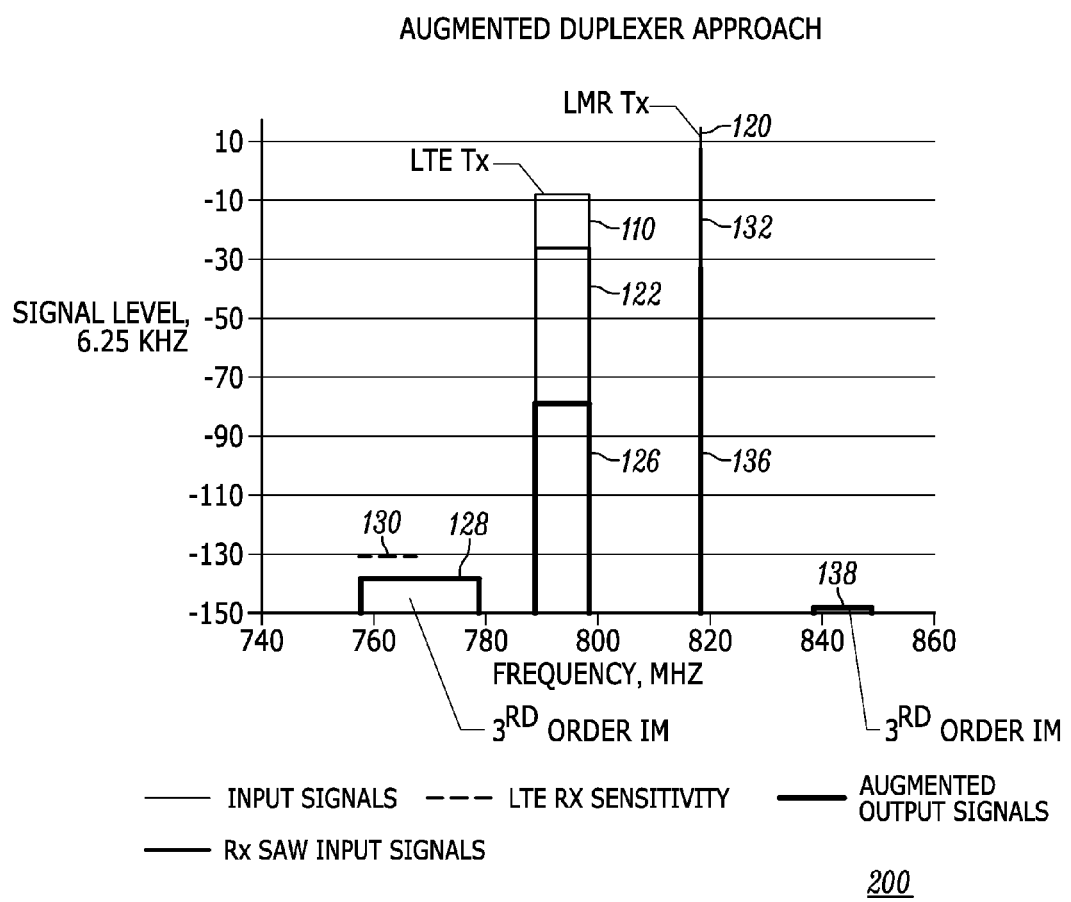
FIG. 2 is a graph in accordance with some embodiments.

FIG. 2 is a graph 200 of signal levels/signal attenuation versus frequency illustrating 3rd order IM in accordance with some embodiments. Frequency is shown on the horizontal axis (MHz) and signal level on the vertical axis (dB) for LTE TX signals at various filtering stages 110, 122, 128 and the LMR TX signals 120, 132, 136 at various filtering stages.

The LTE TX signal 110 is at the antenna 116. The LTE TX signal 122 is at the linear duplexer 108 output. The LTE TX signal 126 is at the SAW filter 124 output.

The LMR TX signal 120 is at antenna 116. The LMR TX signal 132 is at the linear duplexer 108 output. The LMR TX signal 136 is at SAW filter 124 output.

Graph 200 shows how the input signals 126, 136 going into the LNA 139 result in $3^{rd}$ order IM signals 128, 138 at a level below the noise floor. Third order IM is shown below −130 dB and, at a level sufficiently below the LTE sensitivity to not degrade LTE receive path.

Accordingly, the active receive path is advantageously free from interference from spurious emissions caused by the simultaneous transmission 134 of LTE and LMR transmit signals.

Figure 3:
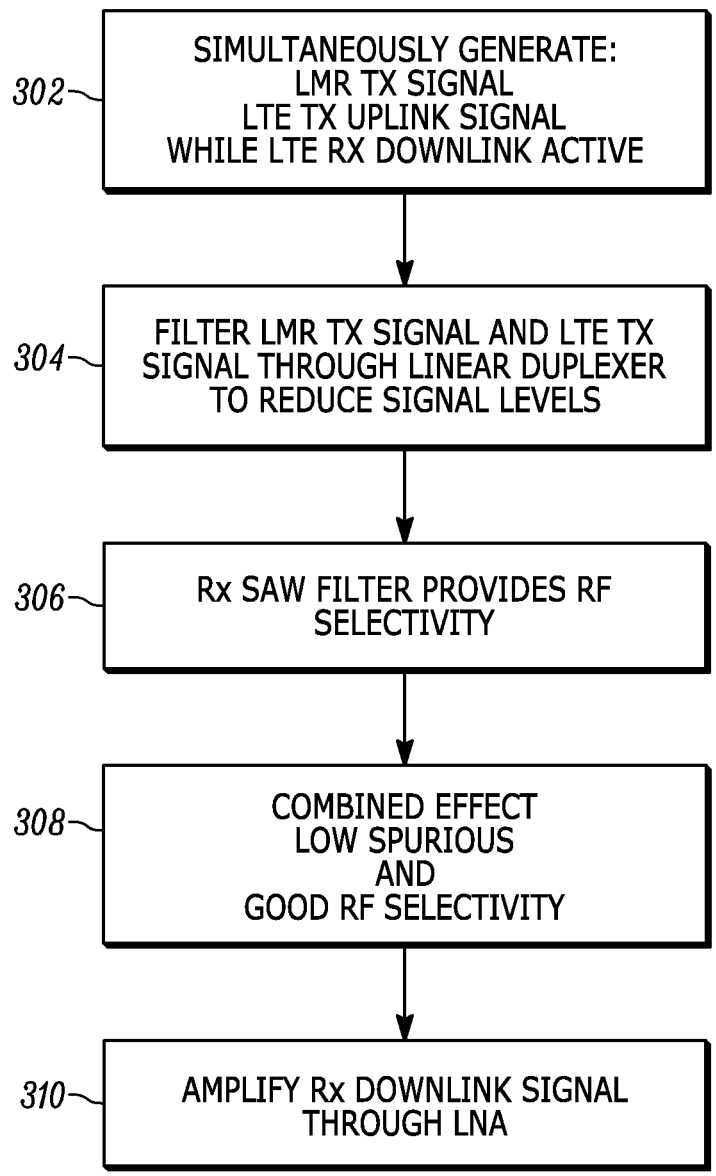
FIG. 3 is a method of filtering in accordance with some embodiments.

FIG. 3 is a method 300 of preventing interfering signals in a receive (RX) LTE path of a portable radio, such as the portable radio of FIG. 1, having LTE and LMR radios circuits in accordance with some embodiments. At 302, the condition of simultaneously generating an LMR transmit (TX) signal and an LTE TX uplink signal occurs, both signals being present at an LTE antenna while an LTE RX downlink is active. This is a condition that could have caused past radios to encounter issues with spurious emissions desensing the receive path. However, at 304 by filtering the LMR TX signal and LTE TX signal through a linear duplexer these signal levels are reduced enough that the following first (RX) SAW filter is linear enough that the IM spurious it creates does not degrade LTE receive path. The RX SAW filter at 306 then provides RF frequency selectivity. Thus, the combined effect of low spurious and good selectivity is achieved 308. Next, the RX downlink signal is amplified at 310 through a low noise amplifier (LNA), the LNA being coupled to an output of the RX SAW filter, thereby generating an amplified receiver signal not impacted by spurious emissions.

As described previously, the linear duplexer may comprise a ceramic linear duplexer. In some embodiments, the linear duplexer reduces the LMR TX signal level and LTE signal level to levels below which the SAW filter generates IM spurs above the RX noise floor.

All of the embodiments further facilitate enabling the radio to be able to operate in LTE full duplex mode and LMR half-duplex mode simultaneously.

Figure 4:
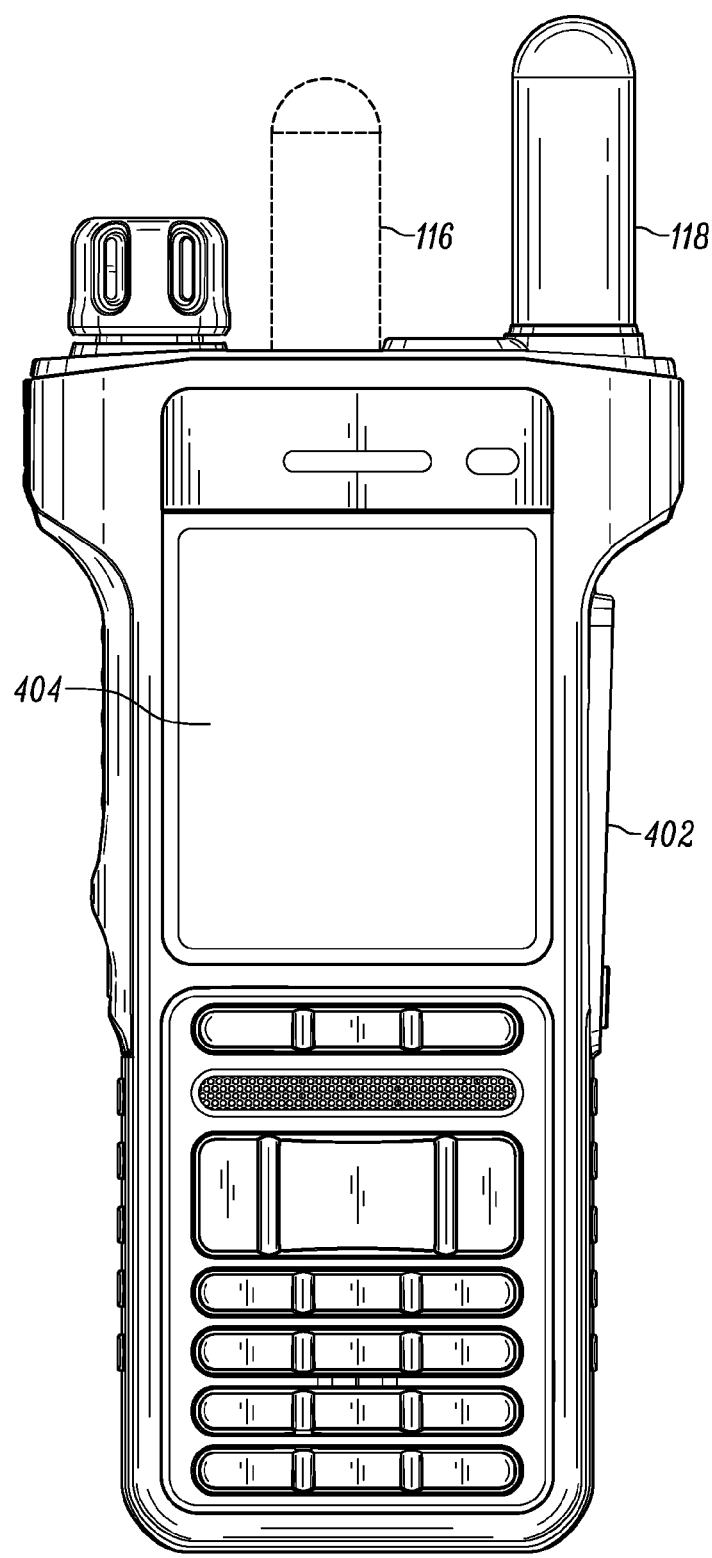
FIG. 4 is a radio incorporating the filtering formed and operating in accordance with some embodiments.

FIG. 4 is a portable radio 400 formed and operating in accordance with some embodiments. In accordance with some embodiments, portable radio 400 provides multiband operation providing LMR radio and LTE radio modes of operation for public safety communications including voice and data. Portable radio 400 comprises circuitry similar to that of FIG. 1 and has a push-to-talk button 402 for keying-up the LMR transceiver, for half-duplex voice transmissions. A display 404 and keypad may be present to facilitate full duplex LTE data transmissions. First and second antennas are shown as LTE TX/RX antenna 116 and LMR antenna 118. While shown externally to the radio housing, it is understood that in some embodiments, one or both of the antennas may be contained either partially or entirely within the housing depending on space constraints.

In accordance with some embodiments, the LMR transceiver of radio 400 can transmit an LMR TX signal at antenna 118 on a first LMR frequency of operation while the LTE transceiver, simultaneously transmits an LTE TX signal at antenna 116 on an uplink frequency, while receiving an LTE RX signal on a downlink frequency at antenna 116. Hence, the LMR TX signal 120 and LTE TX signal 110 are simultaneously present 134 at the LTE antenna 116 during an active receive mode. In accordance with some embodiments, the LMR TX signal and the LTE TX signal are filtered through a linear duplexer and a SAW filter, the SAW filter being implemented as a duplexer with one port terminated, is the combined filtering eliminating interference to the LTE RX signal.

Portable radio 400 provides multiband operation in a public safety environment. As such, portable radio 400 operates the LMR transceiver in frequency bands including 799 to 805 and 805 to 817 megahertz (MHz) and paired with 769 to 775 and 851 to 862 MHz allocated for public safety (PS) narrowband (NB) voice communications by police, fire, and other emergency response teams. These frequencies support "push-to-talk" LMR two-way radio devices used by law enforcement agencies across the country.

The LTE transceiver of portable radio 400 can also operate at 787 to 788 MHz and paired with 746 to 756 MHz (referred to as operating band 13 LTE) for broadband operations, where public operators are the primary operators within this range.

Radio 400 can also operate frequency from 788 to 793 MHz and paired with 758 to 763 MHz for broadband operations for public safety transmissions, as LTE compliant, operating band 14.

Accordingly, there has been provided an improved filtering apparatus and technique for a portable multiband radio which eliminates spurious emissions in an active LTE receive path during the simultaneous transmissions of LTE and LMR transmit signals. The application of a linear duplexer and SAW filter in the LTE receive path provide for augmented filtering in the receive path. The linearity of the duplexer and selectivity of the SAW provide for improved filtering. The linearity of the linear duplexer and selectivity of the first SAW filter (RX SAW filter) prevents intermodulation (IM3, IM5, etc.) signals at the LNA. Portable radios utilizing the improved filtering provided by the various embodiments can now be used in the multiband mode with both transceivers being operational simultaneously without incurring desense in the LTE receive path. Hence, police officers, firefighters, and other emergency response personnel will all benefit from the improved performance of the radio.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:
1. A portable radio, comprising:
a long term evolution (LTE) transceiver having an LTE receive (RX) path and an LTE transmit (TX) path for operation in full duplex mode;
a land mobile radio (LMR) transceiver having an LMR transmit (TX) path and an LMR receive (RX) path for operation in half-duplex mode;
an LTE antenna;
an LMR antenna;
a linear duplexer coupled to the LTE antenna;

first and second surface acoustic wave (SAW) filters coupled to the linear duplexer, the first SAW filter implemented as a duplexer with one port terminated to provide a filter for the LTE RX path of the portable radio, the second SAW filter implemented as a duplexer with one port terminated to provide a filter in the LTE TX transmit path of the portable radio; and the linear duplexer and first SAW filter for filtering an LMR TX signal and an LTE TX signal which are simultaneously present at the LTE antenna, the linear duplexer and first SAW filter combining to eliminate intermodulation spurs before they are generated in an active LTE RX path; and wherein the linear duplexer lowers the signal levels of the simultaneously present LMR TX signal and LTE TX signal beneath predetermined threshold levels, the first SAW filter filtering the lower level LMR TX and LTE TX signals without generating spurious emissions above an acceptable level.

2. The portable radio of claim 1, wherein linear duplexer is a ceramic duplexer.

3. The portable radio of claim 2, wherein the ceramic duplexer provides improved linearity and the first and second SAW filters control frequency selectivity.

4. The portable radio of claim 1, wherein the LMR TX signal and the LTE TX signal which are simultaneously present at the LTE antenna comprise simultaneous uplink of LTE B13/B14 and LMR700/800 transmissions and wherein these simultaneous transmissions do not cause desense on the LTE RX downlink.

5. The portable radio of claim 1, further comprising:
an LTE low noise amplifier (LNA) coupled to the first SAW filter in the LTE RX path.

6. The portable radio of claim 5, wherein the linearity of the linear duplexer and selectivity of the first SAW filter prevents intercept intermodulation signals at the LNA.

7. The portable radio of claim 1, further comprising: an LTE transmit power amplifier (PA) coupled to the second SAW filter in the LTE TX path.

8. The portable radio of claim 1, further comprising:
an LMR transmit power amplifier (PA) and an LMR low noise amplifier (LNA) switchably coupled to the LMR antenna.

9. The portable radio of claim 1, wherein the portable radio operates in LTE full duplex mode and LMR half-duplex mode simultaneously.

10. A method for preventing interfering signals in a receive (RX) path of a portable radio having long term evolution (LTE) and land mobile radio (LMR) transceivers, comprising:
simultaneously generating an LMR transmit (TX) signal and an LTE TX uplink signal, both signals being present at an LTE antenna while an LTE RX downlink is active; and filtering the LMR TX signal and the LTE TX signal through a linear duplexer and a RX surface acoustic wave (SAW) filter, the RX SAW filter being implemented as a duplexer with one port terminated, the linear duplexer and the RX SAW filter combine to eliminate intermodulation spurs before they can be generated in the active LTE RX downlink, and wherein the linear duplexer reduces the LMR TX signal level and LTE signal level to a level that prevents the RX SAW filter from generating IM spurs above the RX noise floor.

11. The method of claim 10, wherein linear duplexer comprises a ceramic linear duplexer, and the RX SAW filter is implemented as a duplexer with one port terminated.

12. The method of claim 10, wherein the linear duplexer comprises:
a ceramic linear duplexer having predetermined transmit-to-receive isolation and predetermined blocker attenuation.

13. A method for preventing interfering signals in a receive (RX) path of a portable radio having long term evolution (LTE) and land mobile radio (LMR) transceivers, comprising:
simultaneously generating an LMR transmit (TX) signal and an LTE TX uplink signal, both signals being present at an LTE antenna while an LTE RX downlink is active; and filtering the LMR TX signal and the LTE TX signal through a linear duplexer and a RX surface acoustic wave (SAW) filter, the RX SAW filter being implemented as a duplexer with one port terminated, the linear duplexer and the RX SAW filter combine to eliminate intermodulation spurs before they can be generated in the active LTE RX downlink, wherein the linear duplexer is a ceramic linear duplexer which lowers the LTE TX signal level and lowers the LMR TX signal level, thereby reducing IM spurs from being generated in the RX SAW filter.

14. A method for preventing interfering signals in a receive (RX) path of a portable radio having long term evolution (LTE) and land mobile radio (LMR) transceivers, comprising:
simultaneously generating an LMR transmit (TX) signal and an LTE TX uplink signal, both signals being present at an LTE antenna while an LTE RX downlink is active;

filtering the LMR TX signal and the LTE TX signal through a linear duplexer and a RX surface acoustic wave (SAW) filter, the RX SAW filter being implemented as a duplexer with one port terminated, the linear duplexer and the RX SAW filter combine to eliminate intermodulation spurs before they can be generated in the active LTE RX downlink, and wherein filtering the LMR TX signal and the LTE TX signal through the linear duplexer comprises lowering levels of the LMR TX signal level and the LTE TX signal level to levels which are sufficient to prevent an interfering spurious signal from being created at an input to the RX SAW filter thereby preventing spurious emissions at an output of the RX SAW filter in the LTE RX path.

15. A method for preventing interfering signals in a receive (RX) path of a portable radio having long term evolution (LTE) and land mobile radio (LMR) transceivers, comprising:
simultaneously generating an LMR transmit (TX) signal and an LTE TX uplink signal, both signals being present at an LTE antenna while an LTE RX downlink is active; and filtering the LMR TX signal and the LTE TX signal through a linear duplexer and a RX surface acoustic wave (SAW) filter, the RX SAW filter being implemented as a duplexer with one port terminated, the linear duplexer and the RX SAW filter combine to eliminate intermodulation spurs before they can be generated in the active LTE RX downlink; and amplifying the RX downlink signal through a low noise amplifier (LNA), the LNA being coupled to an output of the RX SAW filter, thereby generating an amplified receiver signal not impacted by spurious emissions.

16. The method of claim 10, wherein the portable radio operates in LTE full duplex mode and LMR half-duplex mode simultaneously.

17. A portable radio, comprising:
a land mobile radio (LMR) transceiver transmitting an LMR transmit (TX) signal;
a long term evolution (LTE) transceiver simultaneously transmitting an LTE TX signal, and the LTE transceiver simultaneously receiving an LTE RX signal;
a linear duplexer and a RX surface acoustic wave (SAW) filter for filtering the LMR and LTE TX signals, the linear duplexer and RX SAW filter combining to prevent intermodulation spurs from interfering with the LTE RX signal;
a RX low noise amplifier coupled to an output of the RX SAW filter; and
wherein the linear duplexer comprises a ceramic linear duplexer having predetermined transmit-to-receive isolation and predetermined blocker attenuation that ensures reduction of the LMR TX signal level and LTE signal level to levels that prevent RF nonlinearities of the RX SAW filter from generating IM3 spurs above a RX noise floor thereby preventing spurious emissions at the RX SAW filter output into to the RX LNA.

* * * * *